(12) United States Patent
Zhuang

(10) Patent No.: US 12,015,437 B2
(45) Date of Patent: Jun. 18, 2024

(54) FLUORESCENT MOBILE PHONE CASE WITH MARBLE BILLIARD

(71) Applicant: Guangxiang Zhuang, Shenzhen (CN)

(72) Inventor: Guangxiang Zhuang, Shenzhen (CN)

(*) Notice: Subject to any disclaimer, the term of this patent is extended or adjusted under 35 U.S.C. 154(b) by 331 days.

(21) Appl. No.: 17/709,471

(22) Filed: Mar. 31, 2022

(65) Prior Publication Data

US 2022/0224371 A1 Jul. 14, 2022

(51) Int. Cl.
*H04M 1/18* (2006.01)
*H04B 1/3888* (2015.01)
*H04M 1/04* (2006.01)
*H04M 1/72427* (2021.01)

(52) U.S. Cl.
CPC ............ *H04B 1/3888* (2013.01); *H04M 1/04* (2013.01)

(58) Field of Classification Search
None
See application file for complete search history.

(56) References Cited

U.S. PATENT DOCUMENTS

| | | | |
|---|---|---|---|
| 11,622,035 B1* | 4/2023 | Deng | H04M 1/185 455/566 |
| 2015/0381779 A1 | 12/2015 | Yang et al. | |
| 2017/0257132 A1 | 9/2017 | Appiah | |
| 2020/0344334 A1 | 10/2020 | Liu | |
| 2022/0345554 A1* | 10/2022 | Pahl | H04M 1/0264 |
| 2023/0045953 A1* | 2/2023 | Yan | H04B 1/3888 |
| 2023/0223975 A1* | 7/2023 | Higuera | H04M 1/0214 455/575.8 |

* cited by examiner

*Primary Examiner* — Ajit Patel
(74) *Attorney, Agent, or Firm* — Jose Cherson Weissbrot

(57) ABSTRACT

The present disclosure discloses a fluorescent mobile phone case with marble billiard. The fluorescent mobile phone case includes a mobile phone case main body on which fluorescent powder is uniformly provided, where the mobile phone case main body is provided with a fence; a cover plate fixedly arranged above the fence, where the cover plate is made of a transparent material; a metal rod movably arranged on a side edge of the fence; a marble movably arranged in the fence; one or more of a rotary table, a hole, and a spiral coil respectively arranged in the fence; a first fixing member arranged in the mobile phone case main body, disposed under the marble, and used for positioning and fixing the marble; and a second fixing member arranged on the fence and used for fixing the metal rod.

14 Claims, 4 Drawing Sheets

FLUORESCENT MOBILE PHONE CASE WITH MARBLE BILLIARD

TECHNICAL FIELD

The present disclosure relates to the technical field of mobile phone cases, specifically to a fluorescent mobile phone case with marble billiard.

BACKGROUND

At present, mobile phones have been widely used as communication tools. In daily lives, mobile phones have become items that everyone carries. A mobile phone case is invented to make a mobile phone more beautiful and to play a good role in protecting the mobile phone. However, the existing mobile phone case has a single function, only serves as a protective cover sleeved outside the mobile phone, and cannot play a better role. On the other hand, in addition to making calls and texting, current smartphones can also be used for playing games, but playing games on a mobile phone consumes a lot of power. When the mobile phone runs out of power and there is no charger around, people will inevitably feel boring. Therefore, how to effectively utilize the mobile phone case and increase the interestingness of the mobile phone case has become an urgent technical problem to be solved by those skilled in the art. Therefore, in view of the shortcomings in the actual production, implementation, and use of the above-mentioned solutions, the shortcomings are corrected and improved. Meanwhile, in line with the good spirit and concept, under the assistance of professional knowledge and experience, after thinking and testing in many ways, this design is created. Therefore, a fluorescent mobile phone case with marble billiard is provided, which is used to solve the problem that the existing mobile phone case is not interesting.

SUMMARY

One of the purposes of the present disclosure is to provide a fluorescent mobile phone case with marble billiard, so as to solve the above-mentioned problems.

A fluorescent mobile phone case with marble billiard of the present disclosure can be implemented by the following technical solutions:

A fluorescent mobile phone case with marble billiard according to the present disclosure includes a mobile phone case main body on which fluorescent powder is uniformly provided, where the mobile phone case main body is provided with a fence; a cover plate fixedly arranged above the fence, where the cover plate is made of a transparent material; a metal rod movably arranged on a side edge of the fence; a marble movably arranged in the fence; one or more of a rotary table, a hole, and a spiral coil respectively arranged in the fence; a first fixing member arranged in the mobile phone case main body, disposed under the marble, and used for positioning and fixing the marble; and a second fixing member arranged on the fence and used for fixing the metal rod.

In one implementation mode, the mobile phone case main body is further provided with a gap and a plurality of through holes; the gap is formed in the side edge of the mobile phone case main body; and the plurality of through holes are respectively formed in a bottom surface or the side edge of the mobile phone case main body.

In one implementation mode, the gap is a metal sheet which is inlaid on the fence and has a height less than that of the fence; and the metal rod is movably arranged on the side edge of the gap.

In one implementation mode, the plurality of through holes include one or more of a camera hole, a button hole, a horn hole, a charging hole, and an earphone hole.

In one implementation mode, the metal rod is provided with a groove; and the groove is able to move on the gap to aim at and hit against the marble.

In one implementation mode, the marble is a spherical steel ball or an iron ball.

In one implementation mode, a solid circle is provided at a position of the marble, and the solid circle is arranged in the fence in a two-dimensional printed manner.

In one implementation mode, a plurality of different color partitions are arranged on the rotary table surface.

In one implementation mode, the rotary table comprises a rotary table surface, a wheel axle, and a pointer; the rotary table surface is arranged in the fence; the wheel axle is arranged at a center position of the rotary table surface; and the pointer is movably arranged on the wheel axle.

In one implementation mode, the rotary table surface is arranged in the fence in a two-dimensional printed manner.

In one implementation mode, scales are provided on the rotary table surface.

In one implementation mode, the scales are clocks or point scales.

In one implementation mode, a plurality of holes are formed in the side edge of the fence side by side.

In one implementation mode, the number of the spiral coil is three, and the three spiral coils are arranged at a center position in the fence side by side.

In one implementation mode, the first fixing member and the second fixing member are both magnets.

Compared with the existing art, the fluorescent mobile phone case with the marble billiard of the present disclosure has the beneficial effects as follows:

According to the fluorescent mobile phone case with the marble billiard of the present disclosure, it is observed through the transparent cover plate: the metal rod is used to aim at the marble; the metal rod is suppressed with a finger; the metal rod hits against the marble under the action of an external force to apply a force; the marble may possibly hit against the pointer under the action of a hit force, so that the pointer on the wheel axle points to a certain position of the rotary table surface, or the marble may possibly move into a certain hole or a certain spiral coil; at the same time, under the action of the fluorescent powder, a user can play a game at night or in a dim place, so that the marble billiard function of the mobile phone case is effectively enabled at night or in the dim place.

BRIEF DESCRIPTION OF THE DRAWINGS in order to explain the technical solutions of the embodiments of the present disclosure more clearly, the following will briefly introduce the accompanying drawings used in the embodiments. It should be understood that the drawings in the following description only illustrate some embodiments of the present disclosure and thus shall not be deemed as limiting the scope. Those of ordinary skill in the art can obtain other related drawings based on these drawings without creative work.

Figure 1:
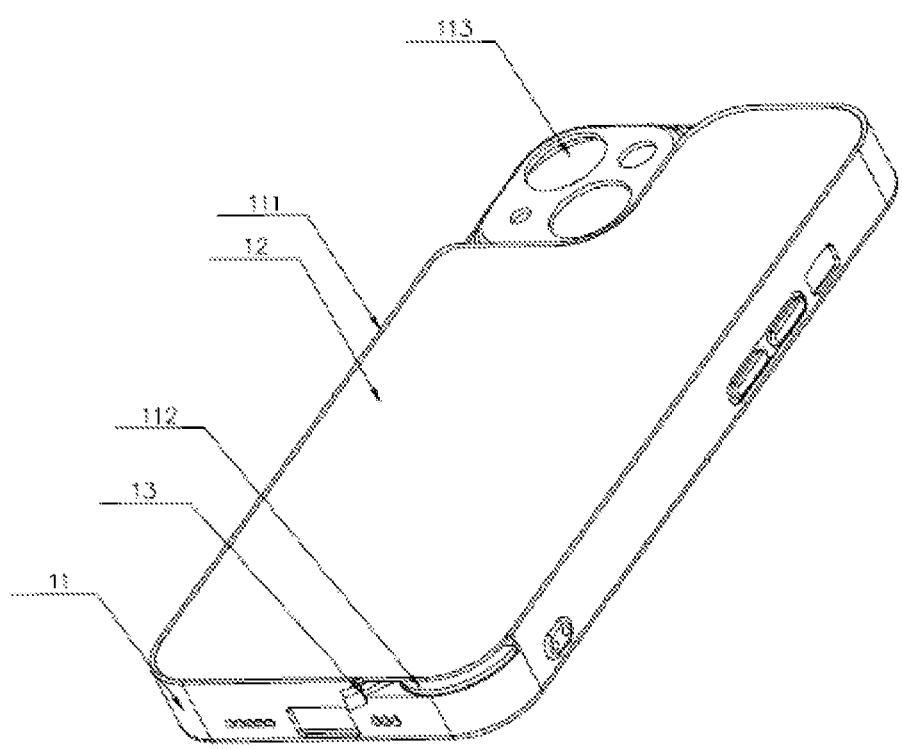
FIG. 1 is a schematic structural diagram of a fluorescent mobile phone case with marble billiard according to the present disclosure.
Figure 2:
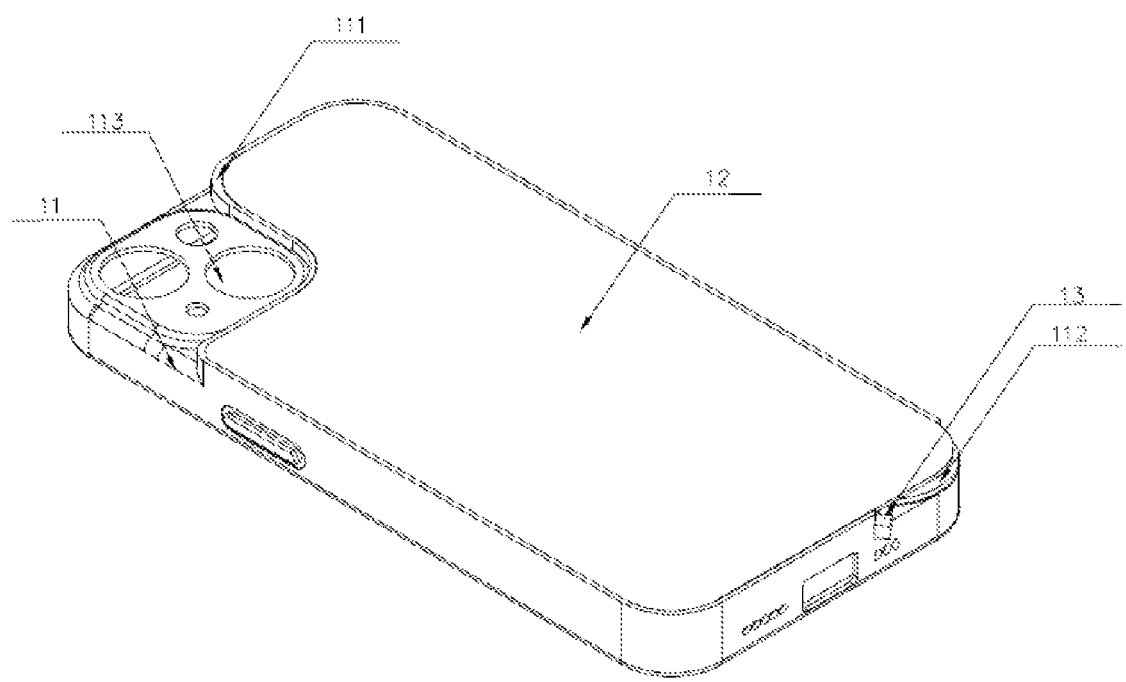
FIG. 2 is a schematic structural diagram of another side surface of the fluorescent mobile phone case with marble billiard shown in FIG. 1 according to the present disclosure.

Reference signs in the drawings: 11: mobile phone case main body; 111: fence; 112: gap; 113: through hole; 12: cover plate; 13: metal rod; 131: groove; 14: marble; 141: solid circle; 15: first fixing member; 16: rotary table; 161: rotary table surface; 162: wheel axle; 163: pointer; 17: hole; 18: spiral coil; and 19: second fixing member.

DETAILED DESCRIPTION OF THE EMBODIMENTS

In order to make the objectives, technical solutions and advantages of the embodiments of the present disclosure clearer, the technical solutions in the embodiments of the present disclosure will be described clearly and completely below in combination with the drawings in the embodiments of the present disclosure. Obviously, the embodiments described herein are part of the embodiments of the present disclosure, not all the embodiments. The components of the embodiments of the present disclosure generally described and shown in the drawings here can be arranged and designed in a variety of different configurations.

Therefore, the following detailed description for the embodiments of the present disclosure provided in the accompanying drawings is not intended to limit the scope of the claimed present disclosure, but merely represents selected embodiments of the present disclosure. Based on the embodiments in the present disclosure, all other embodiments obtained by those of ordinary skill in the art without creative work shall fall within the protection scope of the present disclosure.

It should be noted that similar reference signs and letters indicate similar items in the following drawings. Therefore, once a certain item is defined in one drawing, it is unnecessary to be further defined and explained in the subsequent drawings.

In the description of the present disclosure, it should be noted that orientations or positional relationships indicated by the terms "upper", "lower", and the like are orientations or positional relationships as shown based on the drawings, or orientations or positional relationships where this invention product are usually placed, and are only for the purpose of facilitating and simplifying the description of the present disclosure instead of indicating or implying that devices or elements indicated must have particular orientations, and be constructed and operated in the particular orientations, so that these terms cannot be consulted as limiting the present disclosure.

In addition, in the present disclosure, unless otherwise clearly defined and defined, the first feature being above or under the second feature may include that the first and second features are in direct contact, or may include that the first and second features are not in direct contact but in contact through other features between them. Moreover, the first feature being "on", "at the upper side of", and "on the upper surface of" the second feature includes that the first feature is right above and at the oblique upper side of the second feature, or only indicates that the horizontal height of the first feature is greater than that of the second feature. The first feature being "below", "at the lower side of", and "on the lower surface of" the second feature includes that the first feature is right below and at the oblique lower side of the second feature, or only indicates that the horizontal height of the first feature is less than that of the second feature.

In addition, the terms "horizontal", "vertical", and the like do not mean that the component is required to be absolutely horizontal or overhanging, but may be slightly inclined. For example, "horizontal" only means that its direction is more horizontal than "vertical", and it does not mean that the structure must be completely horizontal, but can be slightly inclined.

In the description of the present disclosure, it should be also noted that unless otherwise explicitly defined and defined, the terms "arranged", "coupled" and "connected" shall be understood broadly, and may be, for example, fixedly connected, or detachably connected, or integrally connected, or mechanically connected, or electrically connected, or directly connected, or indirectly connected through an intermediate medium, or interconnection between two elements. Those of ordinary skill in the art can understand the specific meanings of the above terms in the present disclosure according to specific situations.

Referring to FIG. 1-FIG. 4, a fluorescent mobile phone case with marble billiard according to the present disclosure mainly includes a mobile phone case main body 11, a cover plate 12, a metal rod 13, a marble 14, a first fixing member 15, a rotary table 16, at least one hole 17, at least one spiral coil 18, and a second fixing member 19. Fluorescent powder is uniformly provided on the mobile phone case main body 11. At night or in a dim place, the fluorescent powder will emit weak light for illumination. The mobile phone case main body 11 is provided with a fence 111. The fence 111 is used for preventing the marble 14 from falling out of the mobile phone case main body 11 in a moving process; the cover plate 12 is fixedly arranged above the fence 111 and is used for preventing an object in the fence 111 from falling off and preventing foreign matters from entering the fence 111 to damage the object in the fence. The metal rod 13 is movably arranged on a side edge of the fence 111. The marble 14 is movably arranged in the fence 111. The first fixing member 15 is arrange in the mobile phone case main body 11 and disposed under the marble 14, and is used for positioning and fixing the marble 14. The rotary table 16, the at least one hole 17, and the at least one spiral coil 18 are respectively arranged in the fence 111. The marble 14 can move in the fence 111 under the hit action of the metal rod 13, so that it may possibly enter the rotary table 16, the at least one hole 17, or the at least one spiral coil 18. The second fixing member 19 is arranged on the fence 111 and is used for fixing the metal rod 13, in this embodiment, the rotary table 16, a plurality of holes 17, or a plurality of spiral coils 18 are arranged in the fence 111. In other embodiments, the fence 111 may also be provided with other different numbers of the rotary table 16, the hole 17, and the spiral coil 18. Specifically, the fence 111 is only provided with the rotary table 16, the hole 17, or the spiral coil 18, or may also be provided with any two of the rotary table 16, the hole 17, or the spiral coil 18.

Referring to FIG. 1-FIG. 4, the mobile phone case main body 11 is further provided with a gap 112 and a plurality of through holes 113. The gap 112 is provided on the side edge of the mobile phone case main body 11, and forms an intact barrier together with the fence 111 to prevent the marble 14 from falling out of the mobile phone case main body 11. In this embodiment, the gap 112 is a metal sheet that is inlaid in the fence 111 and has a height less than that of the fence 111. The metal rod 13 is movably arranged on the side edge of the gap 112. The plurality of through holes 113 are respectively formed in a bottom surface or the side edge of the mobile phone case main body 11, and include one or more of a camera hole, a button hole, a horn hole, a charging hole, and an earphone hole. The positions of the camera hole, the button hole, the horn hole, the charging hole, and the earphone hole respectively correspond to the positions of a camera, a button, a horn, a charging interface, and an earphone jack of a corresponding mobile phone model.

Figure 3:
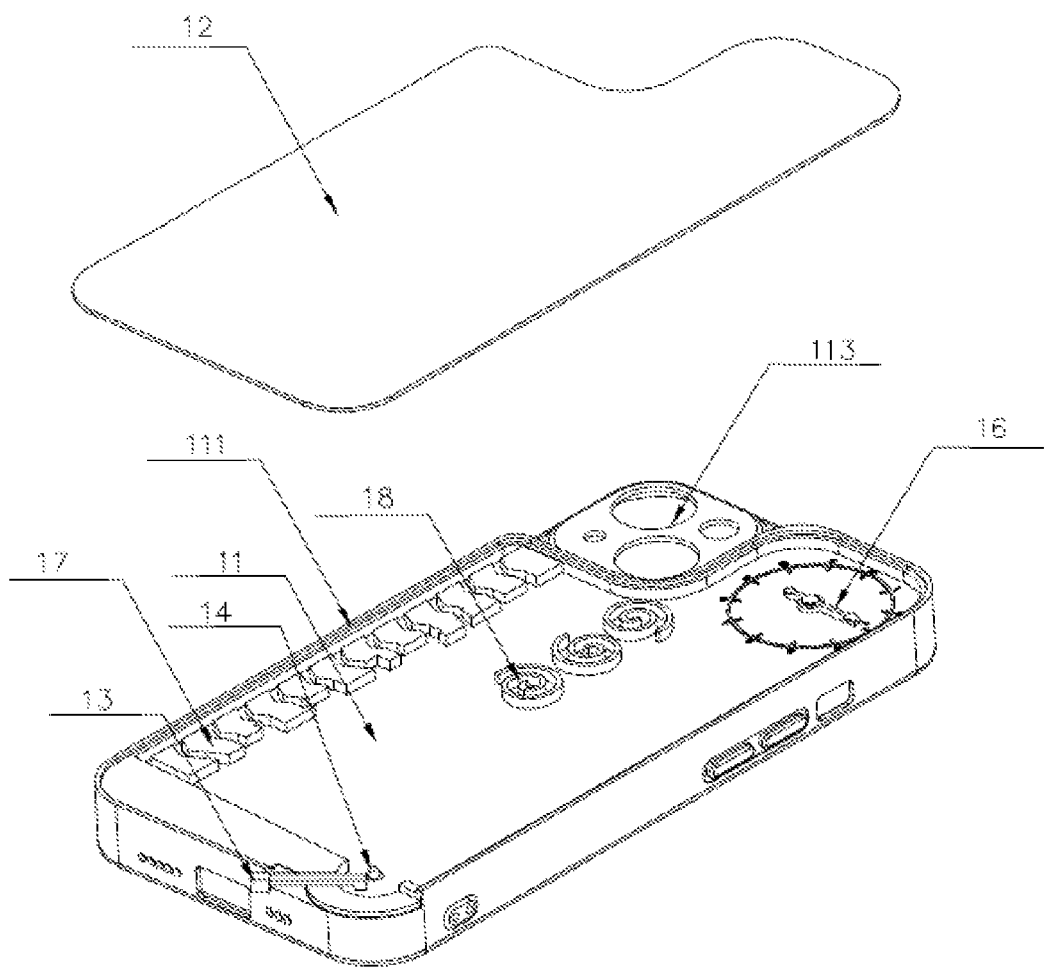
FIG. 3 is a schematic diagram of a partially exploded structure of the fluorescent mobile phone case with marble billiard shown in FIG. 1 according to the present disclosure.
Figure 4:
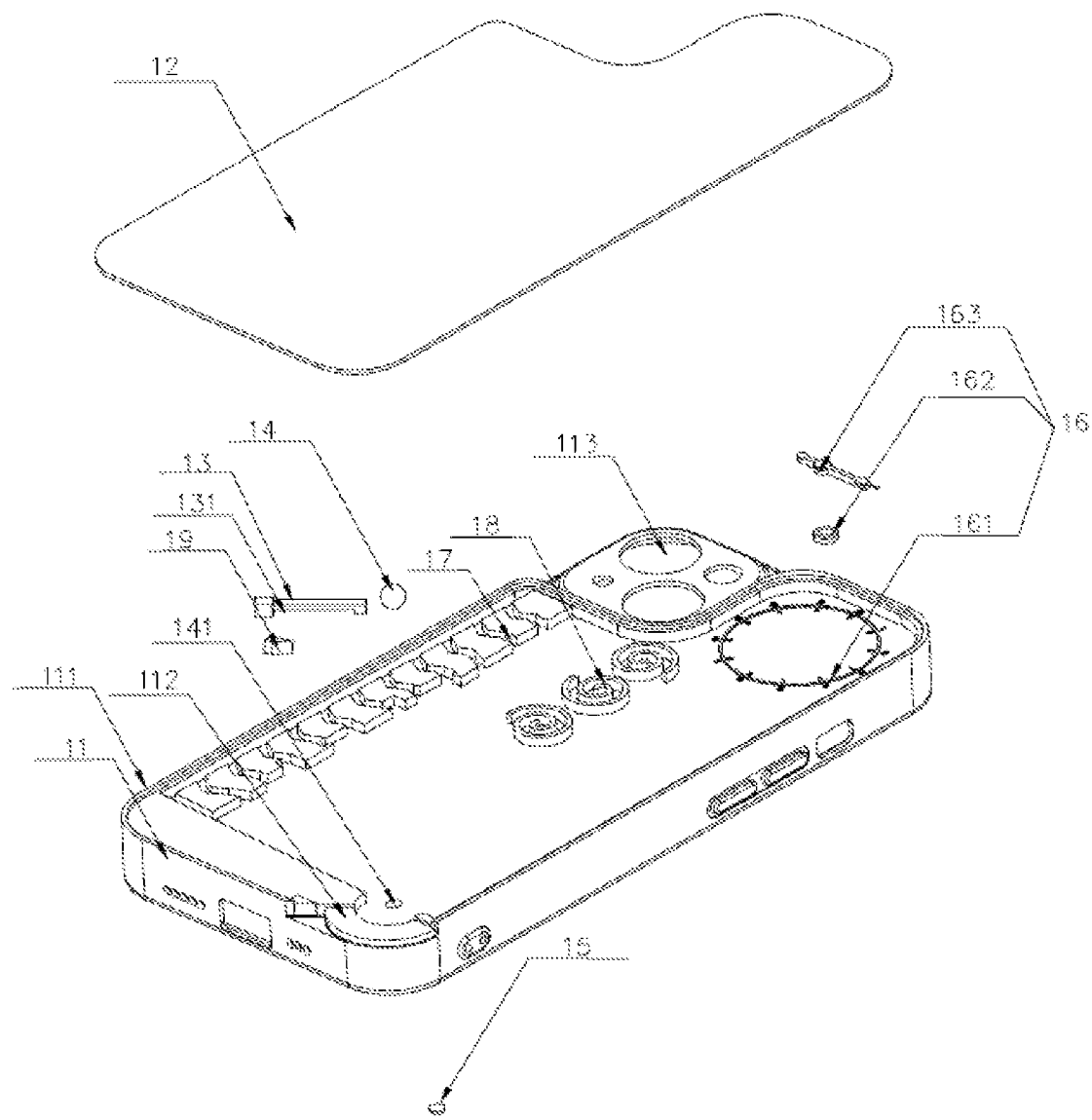
FIG. 4 is a schematic diagram of an exploded structure of the fluorescent mobile phone case with marble billiard shown in FIG. 1 according to the present disclosure.

Referring to FIG. 3 and FIG. 4, in this embodiment, the metal rod 13 is provided with a groove 131. The groove 131 can move on the gap 112 to aim at and hit against the marble 14. One end of the metal rod 13 is provided with a cushion collar that is used for reducing a rebound force when the metal rod 13 is suppressed with a finger. Specifically, the cushion collar is silica gel. The marble 14 may be a spherical steel ball or an iron ball. In this embodiment, the marble 14 adopts the spherical steel ball. In order to better position and fix the marble 14, the first fixing member 15 is arranged under the marble 14. The first fixing member 15 is a magnet that attracts the spherical steel ball. In this embodiment, a solid circle 141 is provided at a position of the marble 14, and the solid circle 141 is arranged in the fence 111 in a two-dimensional printed manner.

Referring to FIG. 3 and FIG. 4, in this embodiment, the rotary table 16 includes a rotary table surface 161, a wheel axle 162, and a pointer 163; the rotary table surface 161 is arranged in the fence 111 in a two-dimensional printed manner; the wheel axle 162 is arranged at a center position of the rotary table surface 161; and the pointer 163 is movably arranged on the wheel axle 162. The pointer 163 call rotate around the rotary table surface 161 under the action of a hit force of the marble 14. When the head of the pointer 163 stops, it can indicate a certain position of the rotary table surface 161. The rotary table surface 161 is provided with scales or a plurality of different color partitions. The scales may be colors or point scales. In this embodiment, the rotary table surface 161 is provided with the clocks.

Referring to FIG. 3 and FIG. 4, at least one hole 17 is arranged in the fence 111, and its position can be set according to an actual demand. In this embodiment, a plurality of holes 17 are arranged in the side edge of the fence 111 side by side. The number of the holes 17 may be one, two, three, or more. At least one spiral coil 18 is arranged in the fence 111, and its position can be set according to an actual need. In this embodiment, the number of the spiral coils 18 is three. The three spiral coils 18 are arranged at the center position in the fence 111 side by side. In other embodiments, the number of the spiral coils 18 may be one, two, four, or more. In this embodiment, the second fixing member 19 is a magnet. The magnet is fixedly arranged on the fence 111 and disposed on the side edge of the gap 112, and attracts and fixes the metal rod 13 through its attraction action.

It should be noted that a using process of the fluorescent mobile phone case with the marble billiard is as follows: It is observed through the transparent cover plate 12: the metal rod 13 moves on the gap 112 to aim at the marble 14; the metal rod 13 is suppressed with a finger; the metal rod 13 linearly moves on the gap 112 through the groove 131; at the same time, the groove 131 has a limiting effect; the metal rod 13 hits against the marble 14 under the action of an external force to apply a force; the marble 14 may possibly hit against the pointer 163 under the action of a hit force, so that the pointer 163 on the wheel axle 162 points to a certain position of the rotary table surface 161, or the marble may possibly move into a certain hole 17 or a certain spiral coil 18; and at the same time, under the action of the fluorescent powder, a user can play a game at night or in a dim place. When the marble billiard function is not used, the marble 14 and the metal rod 13 are respectively fixed by the first fixing member 15 and the second fixing member 19.

The technical features of the embodiments described above can be arbitrarily combined. In order to make the description concise, all possible combinations of various technical features in the above embodiments are not completely described. However, the combinations of these technical features should be considered as the scope described in the present specification as long as there is no contradiction in them.

The above-mentioned embodiments only express several implementation modes of the present disclosure, and their descriptions are more specific and detailed, but they cannot be understood as limiting the patent scope of the present disclosure. It should be noted that those of ordinary skill in the art can further make various transformations and improvements without departing from the concept of the disclosure, and these transformations and improvements all fall within the protection scope of the present disclosure. Therefore, the protection scope of the patent of the present disclosure shall be subject to the appended claims.

What is claimed is:

1. A fluorescent mobile phone case with marble billiard, comprising a mobile phone case main body on which fluorescent powder is uniformly provided, wherein the mobile phone case main body is provided with a fence; a cover plate fixedly arranged above the fence, wherein the cover plate is made of a transparent material; a metal rod movably arranged on a side edge of the fence; a marble movably arranged in the fence; one or more of a rotary table, a hole, and a spiral coil respectively arranged in the fence; a first fixing member arranged in the mobile phone case main body, disposed under the marble, and used for positioning and fixing the marble; and a second fixing member arranged on the fence and used for fixing the metal rod, wherein the mobile phone case main body is further provided with a gap and a plurality of through holes; the gap is formed in the side edge of the mobile phone case main body; and the plurality of through holes are respectively formed in a bottom surface or the side edge of the mobile phone case main body.

2. The fluorescent mobile phone case with the marble billiard according to claim 1, wherein the gap is a metal sheet which is inlaid on the fence and has a height less than that of the fence; and the metal rod is movably arranged on the side edge of the gap.

3. The fluorescent mobile phone case with the marble billiard according to claim 1, wherein the plurality of through holes comprise one or more of a camera hole, a button hole, a horn hole, a charging hole, and an earphone hole.

4. The fluorescent mobile phone case with the marble billiard according to claim 1, wherein the metal rod is provided with a groove; and the groove is able to move on the gap to aim at and hit against the marble.

5. The fluorescent mobile phone case with the marble billiard according to claim 4, wherein the marble is a spherical steel ball or an iron ball.

6. The fluorescent mobile phone case with the marble billiard according to claim 5, wherein a solid circle is provided at a position of the marble, and the solid circle is arranged in the fence in a two-dimensional printed manner.

7. The fluorescent mobile phone case with the marble billiard according to claim 1, wherein the rotary table comprises a rotary table surface, a wheel axle, and a pointer; the rotary table surface is arranged in the fence; the wheel axle is arranged at a center position of the rotary table surface; and the pointer is movably arranged on the wheel axle.

8. The fluorescent mobile phone case with the marble billiard according to claim 7, wherein the rotary table surface is arranged in the fence in a two-dimensional printed manner.

9. The fluorescent mobile phone case with the marble billiard according to claim 8, wherein scales are provided on the rotary table surface.

10. The fluorescent mobile phone case with the marble billiard according to claim 9, wherein the scales are clocks or point scales.

11. The fluorescent mobile phone case with the marble billiard according to claim 8, wherein a plurality of different color partitions are arranged on the rotary table surface.

12. The fluorescent mobile phone case with the marble billiard according to claim 1, wherein a plurality of holes are formed in the side edge of the fence side by side.

13. The fluorescent mobile phone case with the marble billiard according to claim 1, wherein the number of the spiral coil is three, and the three spiral coils are arranged at a center position in the fence side by side.

14. The fluorescent mobile phone case with the marble billiard according to claim 1, wherein the first fixing member and the second fixing member are both magnets.

* * * * *